United States Patent
Jonsson et al.

(10) Patent No.: US 8,944,139 B2
(45) Date of Patent: Feb. 3, 2015

(54) METHOD FOR MANUFACTURING AN ENGINE COMPONENT

(75) Inventors: Peter Jonsson, Hjärtum (SE); Dzevad Imamovic, Trollhättan (SE); Börje Nordin, Trollhättan (SE); Per Thorin, Uddevalla (SE)

(73) Assignee: Volvo Aero Corporation, Trollhättan (SE)

( * ) Notice: Subject to any disclaimer, the term of this patent is extended or adjusted under 35 U.S.C. 154(b) by 0 days.

(21) Appl. No.: 13/265,857

(22) PCT Filed: Apr. 24, 2009

(86) PCT No.: PCT/SE2009/000216
§ 371 (c)(1),
(2), (4) Date: Feb. 23, 2012

(87) PCT Pub. No.: WO2010/123413
PCT Pub. Date: Oct. 28, 2010

(65) Prior Publication Data
US 2012/0138258 A1  Jun. 7, 2012

(51) Int. Cl.
B22D 19/00 (2006.01)
B22F 3/105 (2006.01)
B22F 3/24 (2006.01)

(52) U.S. Cl.
CPC ......... *B22F 3/1055* (2013.01); *B22F 2003/248* (2013.01)
USPC .......................................................... 164/98

(58) Field of Classification Search
USPC ................................................. 164/4.1, 98
See application file for complete search history.

(56) References Cited

U.S. PATENT DOCUMENTS

| 6,064,031 | A | 5/2000 | Talwar |
| 7,073,561 | B1 | 7/2006 | Henn |
| 7,586,061 | B2 * | 9/2009 | Hoebel et al. ............ 219/121.83 |
| 2008/0014457 | A1 | 1/2008 | Gennaro et al. |
| 2008/0220177 | A1 * | 9/2008 | Hass et al. .................... 427/446 |

FOREIGN PATENT DOCUMENTS

GB  2440547 A  2/2008

OTHER PUBLICATIONS

International Search Report for corresponding International Application PCT/SE2009/000216, Jan. 28, 2010.
International Preliminary Report on Patentability for corresponding International Application PCT/SE2009/000216, Apr. 11, 2011.

\* cited by examiner

*Primary Examiner* — Kevin P Kerns
(74) *Attorney, Agent, or Firm* — WRB-IP LLP

(57) ABSTRACT

A method for manufacturing an engine component includes forming the component by deposition of powder, which is melted by a heat source, in subsequent Layers to form the component into a desired shape, the component having an outer surface, and re-melting at least part of the outer surface.

18 Claims, 6 Drawing Sheets

METHOD FOR MANUFACTURING AN ENGINE COMPONENT

BACKGROUND AND SUMMARY

The invention relates to a method for manufacturing an engine component comprising the steps of forming a component on a substrate by deposition of molten metal in subsequent layers to form said component into a desired shape, said component having an outer surface. The invention in particular relates to a manufacturing method suitable for the production of an engine structure in the form of a ring shaped structure particularly suitable as a gas turbine engine component.

A gas turbine includes a plurality of ring shaped metal structures which are assembled to form gas flow channels of the gas turbine. A gas turbine includes further engine components necessary for the function of the gas turbine. Examples of such components may be fuel injectors or vanes arranged to guide the flow through the gas flow channels of the gas turbine. In order to secure such an engine component to the ring shaped metal structure a protruding feature such as a stub, a boss a flange or a weld prep may be present on the surface of the ring shaped sheet metal structure in order to facilitate securing of the engine component to the ring shaped sheet metal structure.

The gas turbine may particularly be used as a jet engine. The term jet engine includes various types of engines, which admit air at relatively low velocity, heat it by combustion and shoot it out at a much higher velocity. Accommodated within the term jet engine are, for example, turbojet engines and turbo-fan engines. The invention will below be described for a turbo-fan engine, but may of course also be used for other engine types.

An aircraft engine of the turbofan type generally comprises a forward fan and booster compressor, a middle core engine, and an aft low pressure power turbine. The core engine comprises a high pressure compressor, a combustor and a high pressure turbine in a serial relationship. The high pressure compressor and high pressure turbine of the core engine are interconnected by a high pressure shaft. The high-pressure compressor, turbine and shaft essentially form a high pressure rotor. The high-pressure compressor is rotatably driven to compress air entering the core engine to a relatively high pressure. This high pressure air is then mixed with fuel in the combustor and ignited to form a high energy gas stream. The gas stream flows aft and passes through the high-pressure turbine, rotatably driving it and the high pressure shaft which, in turn, rotatably drives the high pressure compressor. The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. In civil applications most of the thrust produced is generated by the fan while in military applications most of the thrust produced is generated by the low and high pressure turbines. Engine frames are used to support and carry the bearings, which in turn, rotatably support the rotors. Conventional turbo fan engines have a fan frame, a mid-frame and an aft turbine frame. These frames may be constructed by a gas turbine component comprising one or more ring shaped structures.

Different approaches of fabricating the ring shaped structures have been used in the past. Conventionally the ring shaped structure may be cast, where after the cast piece is machined to provide desired surface properties of the ring shaped structure. For instance, stubs forming a base for the attachment of an engine component may be formed in the machining process.

A novel approach to formation of the ring shaped structures may be performed by fabricating bosses, webs and stubs to a ring shaped sheet metal structure. Hence, the gas turbine component comprises a ring shaped sheet metal structure. The use of a sheet metal structure as a ring shaped element in the gas turbine facilitates production of thin gas turbine components.

This new manufacturing technology shows a great potential in reducing weight, shortening fabrication lead time and increasing flexibility in product development. Moreover, sheet material of a specific alloy has in general improved material properties compared to cast. Furthermore tighter tolerances of the thickness of the end product may be obtained with sheet metal in comparison to cast structures.

In the novel method of formation of a ring shaped structure including a step of fabricating a protruding feature such as a boss, a web and a stub to a ring shaped sheet metal structure the gas turbine component may furthermore include an engine component attached to the protruding feature. The protruding feature such as the stub, web or boss is deposited on said cylindrical sheet metal structure by use of a metal deposition technique.

The gas turbine component may furthermore include a plurality of webs deposited on said cylindrical sheet metal structure by use of a metal deposition technique. The plurality of webs may extend from said stub to take up load applied from said engine component via said stub and to reinforce said gas turbine component The inclusion of metal deposited webs ensures that a thin ring shaped sheet metal structure may be used, while allowing the webs to take up the load.

In metal deposition techniques a component or structure is formed by adding molten metal in a layer by layer fashion. The layers are fused together in the deposition process thus enabling the formation of a dense body. The layers are therefore not noticeable for practical purposes in the interior of the formed component. However, the layers may be discerned on the outer surface of the formed component as fine lines indicating the presence of different layers. On the surface of the layers, the edge portions of the layers will be slightly curved due to surface tension. The outer surface of the so-produced component must for many applications be subsequently machined in order to smooth out the plurality of curvatures at the edge portions of the layers.

It is desirable to provide a method defined in the introduction above, which method is more cost-efficient than prior art methods in achieving a component of equal or improved operational characteristics.

According to an aspect of the inventive method an engine structure is manufactured in a method including the steps of forming a component on a substrate by deposition of molten metal in subsequent layers to form said component into a desired shape, said component having an outer surface and re-melting at least part of said outer surface. In this way, an equal or improved surface smoothness of the component is achieved in relation to prior art methods, which in turn can reduce the risk of fatigue failure in operation. By the step of re-melting at least part of the surface, the shape of the part which is re-melted is transformed. Especially, the method comprises the step of forming the component on the substrate by deposition of a succession of layers on top of each other, wherein said at least part of said outer surface is defined by the ends of the layers in a layer extension direction.

Further, an improved microstructure can be achieved by said re-melting (smaller grains and thereby improved mechanical properties) due to a fast cooling.

By re-melting a lower rim of the component at an interface between the component and the substrate, the surface becomes smoother and stress concentration is reduced. It is particularly advantageous if the lower rim after the re-melting assumes a concave curvature, i.e a radius. The concave curvature allows for a relative large curvature radius at the transition between the substrate forming the engine structure and the deposited component.

Since stress concentration occurs at the transition between the engine structure and the component, the formation of a concave smooth surface at this area substantially reduces the risk for fatigue failure. Hence re-melting creates reshaping of the outer contour of the component from a set of convex outer rims, one for each layer, to a single concave area, preferably at a lower rim of the component, which lower rim adheres to an engine structure or which lower rim is intended to be mounted to an engine structure. This reshaping of the lower rim removes the necessity of further after-treatment steps such as milling.

According to an example, the method comprises the further step of depositing a plurality of the layers with different lengths in the layer extension direction so that said outer surface assumes a curvature. By depositing the layers in such a way, a base shape can be achieved before the re-melting step finally shapes the contour of the component.

Furthermore, by the step of re-melting, a surface roughness of the at least part of the outer surface which is heat treated is reduced. Due to the reduced surface roughness, the risk of fatigue failure is reduced. The component may be attached to an engine structure, but is preferably directly formed thereon by performing the deposition of molten metal in subsequent layers on said engine structure to form said component into a desired shape using said engine structure as a substrate. In this case the outer surface of said component includes a lower rim at which a transition between said component and said engine structure is located. The at least part of said outer surface which is heat treated is preferably constituted by the lower rim. The lower rim may preferably be constituted by outer rims of a number of layers being closest to the engine structure. For purpose of clarity it must be observed that the lower rim is not constituted by the inner parts of the lower layer which directly adheres to the engine structure, but of the outer rims of a set of layers being closest to the engine structure. By re-melting of the lower rim, it is ensured that the area at which stress concentration normally occurs has a reduced surface roughness whereby the risk for fatigue failure is substantially reduced.

According to a further example, the method step of re-melting at least part of said outer surface is performed without depositing any material.

According to a further example, said substrate is formed by a ring element for an engine structure and that the component forms part of a radial element extending from the ring element for guiding a gas flow through an engine in operation. Engine structures, in particular engine structures for gas turbine engines are subject to substantial load when used. The inventive method is therefore particularly advantageous for achieving an engine structure less sensitive to load when producing an engine structure in the form of a ring shaped gas turbine engine structure.

The inventive method may thus be used for production of an engine structure in the form of a ring shaped gas turbine component, where a component is metal deposited on the ring shaped sheet metal structure. The second component includes a lower rim at which a transition between said second component and said first component is located. The lower rim may thereafter be subjected to treatment with a heat source to reduce a surface roughness of said lower rim.

BRIEF DESCRIPTION OF DRAWINGS

The invention will be explained in further detail below, with reference to embodiments shown on the appended drawings, wherein.

DETAILED DESCRIPTION

Figure 1:
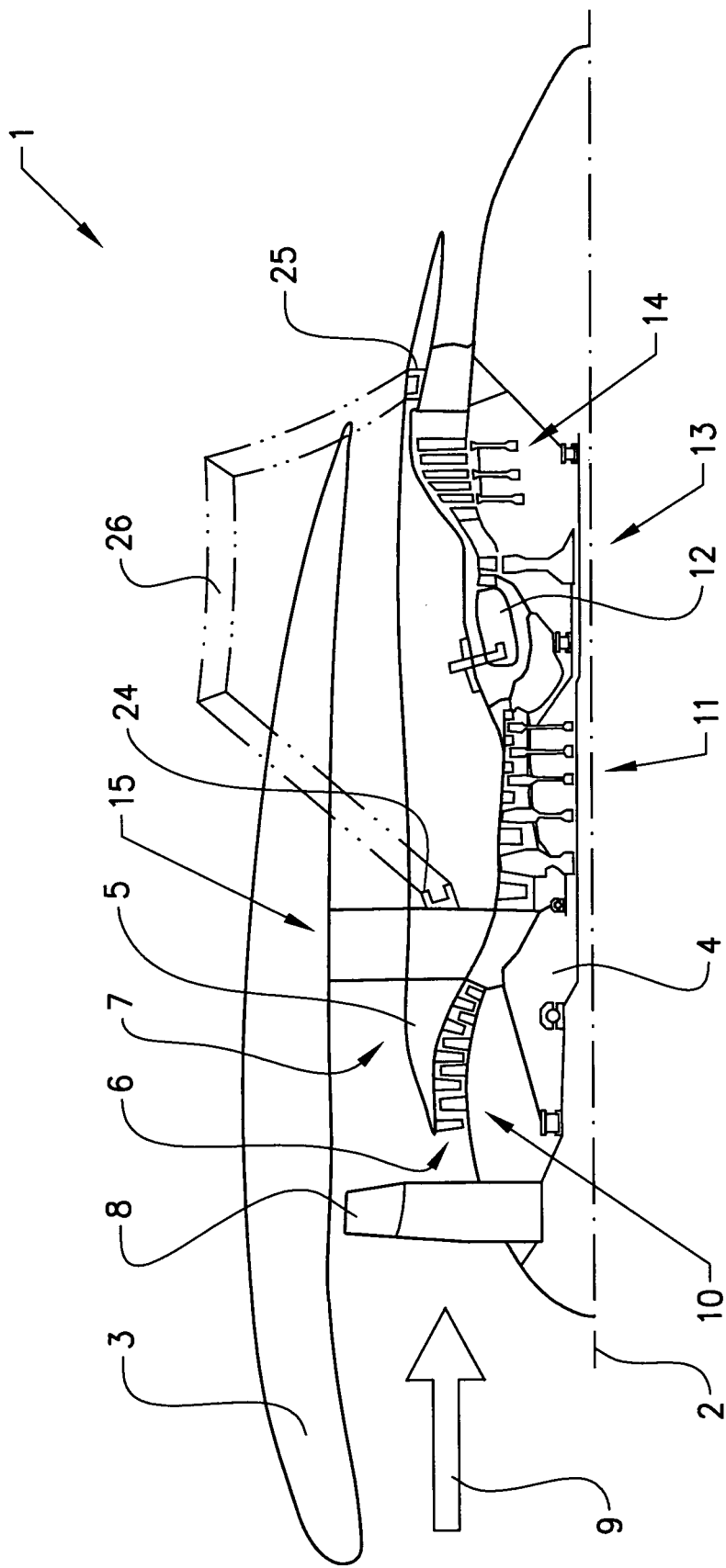
FIG. 1 illustrates an aircraft engine in a schematic cut side view.

The invention will below be described for a turbofan gas turbine aircraft engine 1, which in FIG. 1 is circumscribed about an engine longitudinal central axis 2. The engine 1 comprises an outer casing 3, or nacelle, an inner casing 4, and an intermediate casing 5, which is concentric to the first two casings and divides the gap between them into an inner primary gas channel 6, or core duct, for the compression of air and a secondary channel 7 in which the engine bypass air flows. Thus, each of the gas. channels 6, 7 is annular in a cross section perpendicular to the engine longitudinal central axis 2. The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A high pressure shaft joins the high pressure turbine 13 to the high pressure compressor 11 to form a high pressure rotor. A low pressure shaft joins the low pressure turbine 14 to the low pressure compressor 10 to form a low pressure rotor. The high pressure compressor 11, combustor 12 and high pressure turbine 13 are collectively referred to as a core engine. The low pressure shaft is at least in part rotatably disposed co-axially with and radially inwardly of the high pressure rotor. A load carrying, torsionally rigid engine structure 15, in the following referred to as a static component, is arranged between the low pressure compressor 10 and the high pressure compressor 11 in the axial direction of the engine 1. The load carrying static component is also known as a case, housing or frame. The load carrying, torsionally rigid engine structure 15 is highly loaded during certain periods of a normal operating cycle of the engine.

The engine 1 is mounted to the aircraft (not shown) at a forwardly located fan frame forward mount 24 on the static component 15 and at a rearward located turbine frame aft mount 25 on the turbine frame. A mount system 26, normally comprising a pylon extending downwards from an aircraft wing and associated thrust links, is schematically indicated in FIG. 1. The mount system 26 is secured to the forward and aft mounts 24, 25.

Figure 2:
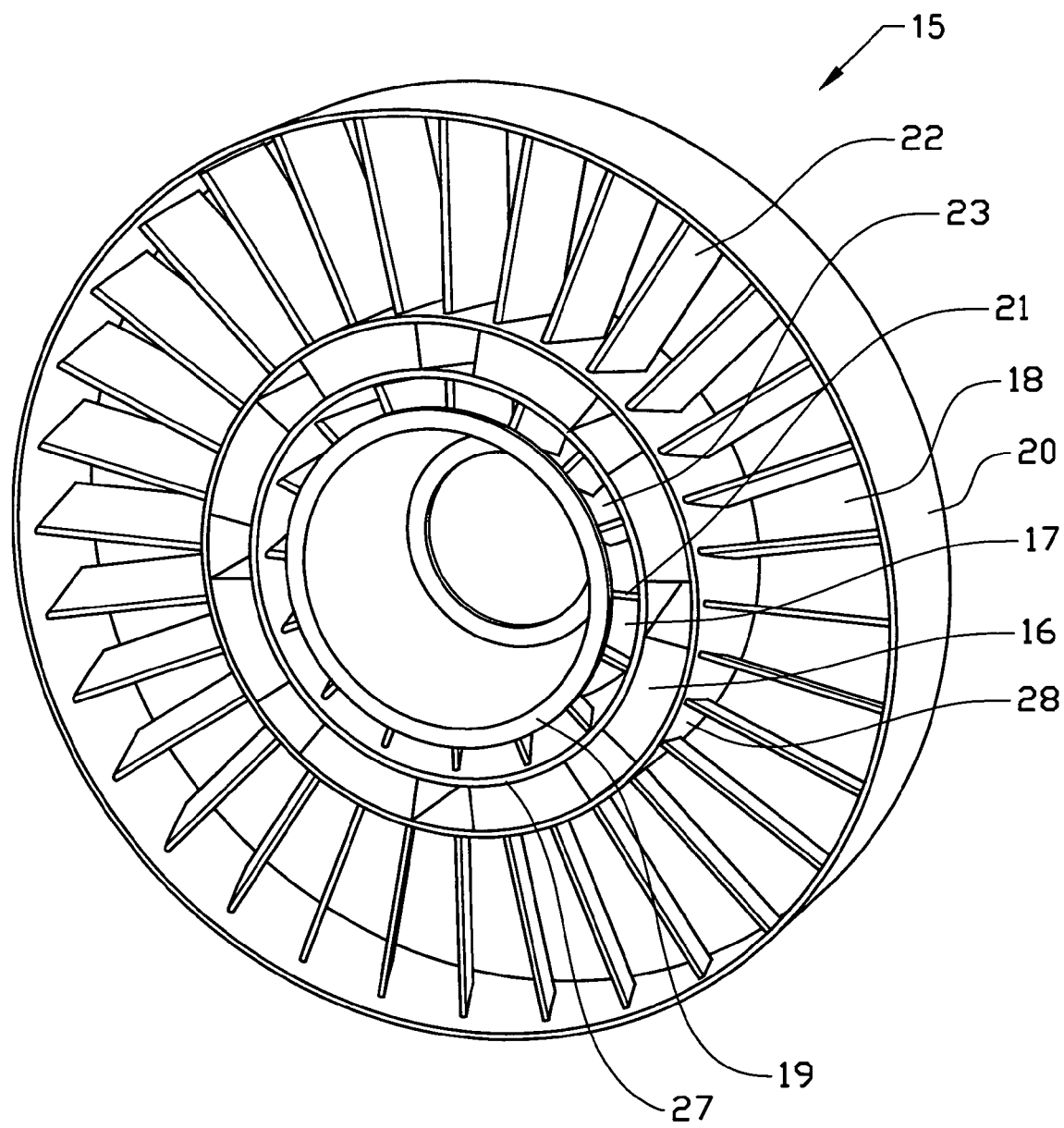
FIG. 2 illustrates a static gas turbine component for the aircraft engine in FIG. 1 in a perspective view.

FIG. 2 illustrates a perspective view of the load carrying, torsionally rigid engine structure 15. The load carrying, torsionally rigid engine structure is a static component. The static component 15 comprises an annular intermediate member, or splitter, 16, which defines inner and outer annular passages 17, 18. The inner passage 17 forms part of the inner primary gas channel 6 of the aircraft engine and the outer passage 18 forms part of the secondary channel 7 in which the engine bypass air flows.

The annular intermediate member 16 is supported between an inner annular support member 19 and an outer annular support member 20 by a plurality of circumferentially spaced radial inner and outer struts 21, 22, or stator vanes. The inner and outer support members 19, 20 and the annular intermediate member 16 are coannular. Opposite ends of the inner struts 21 are rigidly connected to the inner annular member 19 and the intermediate member 16 for transmitting structural loads between the members. Opposite ends of the outer struts 22 are rigidly connected to the intermediate member 16 and the outer annular member 20 for transmitting structural loads between the members. The air is forced in a rearward direction through openings between adjacent struts 21, 22.

The annular intermediate member 16 comprises an outer ring 27 and an inner ring 28 of metal material, which defines the outer passage 18 and the inner passage 17, respectively.

Figure 3:
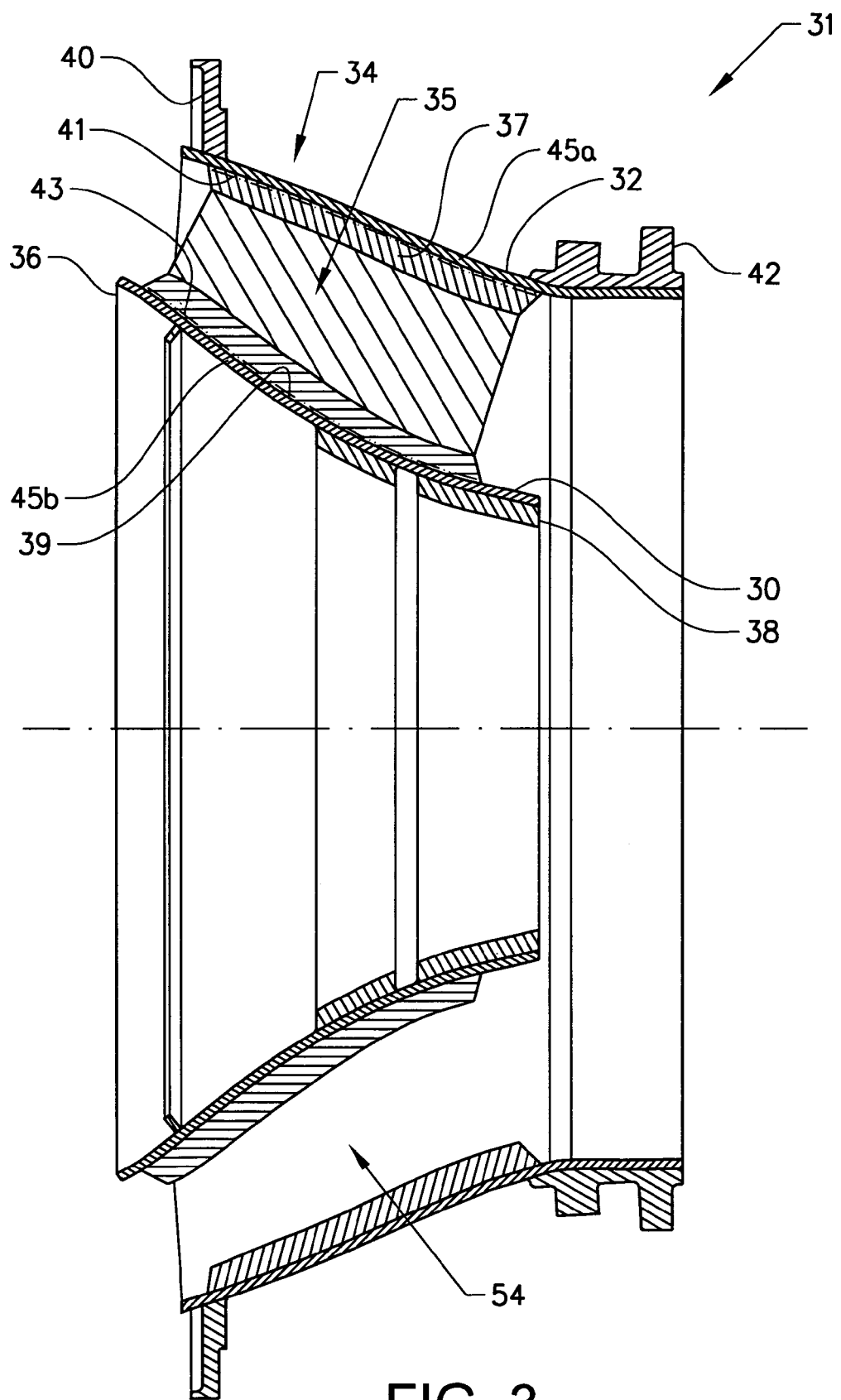
FIG. 3 illustrates a cross section of a gas turbine engine component comprising an inner ring, an outer ring and at least one strut connecting the inner ring with the outer ring.

In FIG. 3, a gas turbine engine structure 31 is illustrated in cross section. The component may be constituted by the structure defining the core channel at the static component 15 mentioned here above. The gas turbine engine structure 31 comprises an inner ring 30, an outer ring 32 and at least one strut 34 connecting the inner ring 30 with the outer ring 32. The inner ring 30 extends from a front flange portion 36 to an end flange portion 38. The outer•ring 32 extends from a front flange portion 40 to an end flange portion 42. The flange portions serves for connection to upstream and downstream engine sections. The core channel, where the gas turbine component according to the invention may for example be used, may be defined by an inner and outer ring having radii that are decreasing or increasing in the downstream direction. The outer and inner rings 30, 32 may thus have the shapes of two essential frustoconical shells.

The inner and outer rings are connected by a set of struts, of which one complete strut 34 is shown in the upper part of the figure. The struts are evenly distributed along the circumphery of the gas turbine engine structure. The struts may be composed on a mid component 35 connected to an upper and a lower stub 37, 39. The mid component 35 has preferably a stream line profile in order to disturb the flow as little as possible. The stubs 37, 39 are attached to the outer and inner rings 30, 32 or integral parts of the inner and outer rings 30, 32. The stubs 37, 39 may preferably be formed in accordance with the method according to the invention. The stubs are thus formed by deposition of molten metal in subsequent layers to form said stubs, which will be described in more detail below with reference to FIGS. 4-7.

After the stubs have been fabricated by metal deposition on the outer and inner rings 30,32, the lower rims 41, 43 of respective stub are re-melted in order to reduce the surface roughness of the lower rim. The lower rims 41, 43 are preferably constituted by the periphery of a set of layers close to sheet metal rings 45a, 45b forming base bodies for the outer and inner rings respectively. In an embodiment the lower rims 41, 43 are constituted by the 5-10 closest layers of deposited metal which are closest to the inner and outer rings 30, 32 respectively. The re-melting will result in that the surface roughness of the lower rim is reduced. Preferably sufficient energy is provided to re melt the lower rim such that it assumes a concave curvature. Before the re-melting the lower rim has the shape of a plurality of outer rims with a convex curvature, one outer rim for each layer. After the re-melting the lower rim is re-melted to assume a shape having a single concave curvature. The concave curvature is assumed under influence of gravity which during the re-melting transports molten metal toward a base at which a transition between said component and said engine structure is located. Furthermore the re-melting transforms the outer rims of the treated layers from a set of convex shapes to a smoother structure since re-melting will act to allow the rather small curvature radii of the outer rims to integrate into a common more large curvature radius of the lower rim. The transfer from a set of outer rims for a set of layers having convex curvature to a single outer rim having a concave curvature is gradual and depends on the degree of re-melting of the lower rim. However, surface tension of the re-melted material will act to gradually reduce the surface roughness and the gravity will gradually transform the outer rims of the layers to a lower rim having a common concave curvature. In addition to the stubs describe above also other components may be fabricated with the use of a method according to the invention, such as bosses for attachments of engine components to the engine structure.

Figure 4:
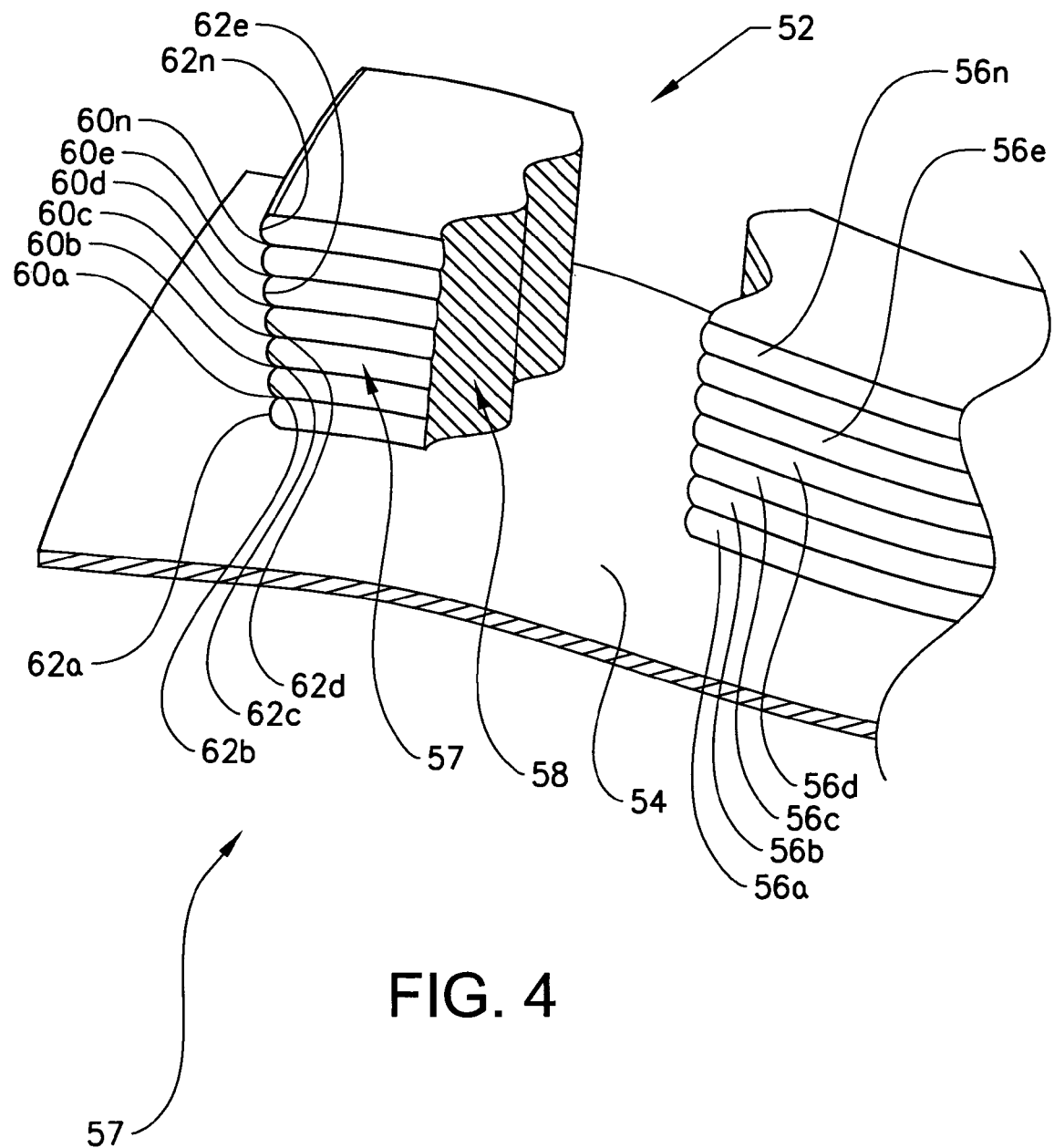
FIG. 4 shows a component formed by a metal deposition technique on a substrate.

FIG. 4 shows a component 52 formed by a metal deposition technique on a substrate 54. The component 52 includes a plurality of layers 56a-56n deposited in a sequential manner to form the component 52. A cut out section 58 is shown in FIG. 4. The cut out section 58 is a machined pit cutting through the plurality of layers: As is evident from the figure, the layers are not separable within the interior of the body, resulting from a fusion of the layers to form a dense body. However, on the outer surface 57 of the formed component the layers may be discerned as fine lines 60a-60n indicating the presence of different layers. Each layer has an outer rim 62a-62n which is slightly curved in a convex manner due to surface tension.

Figure 5:
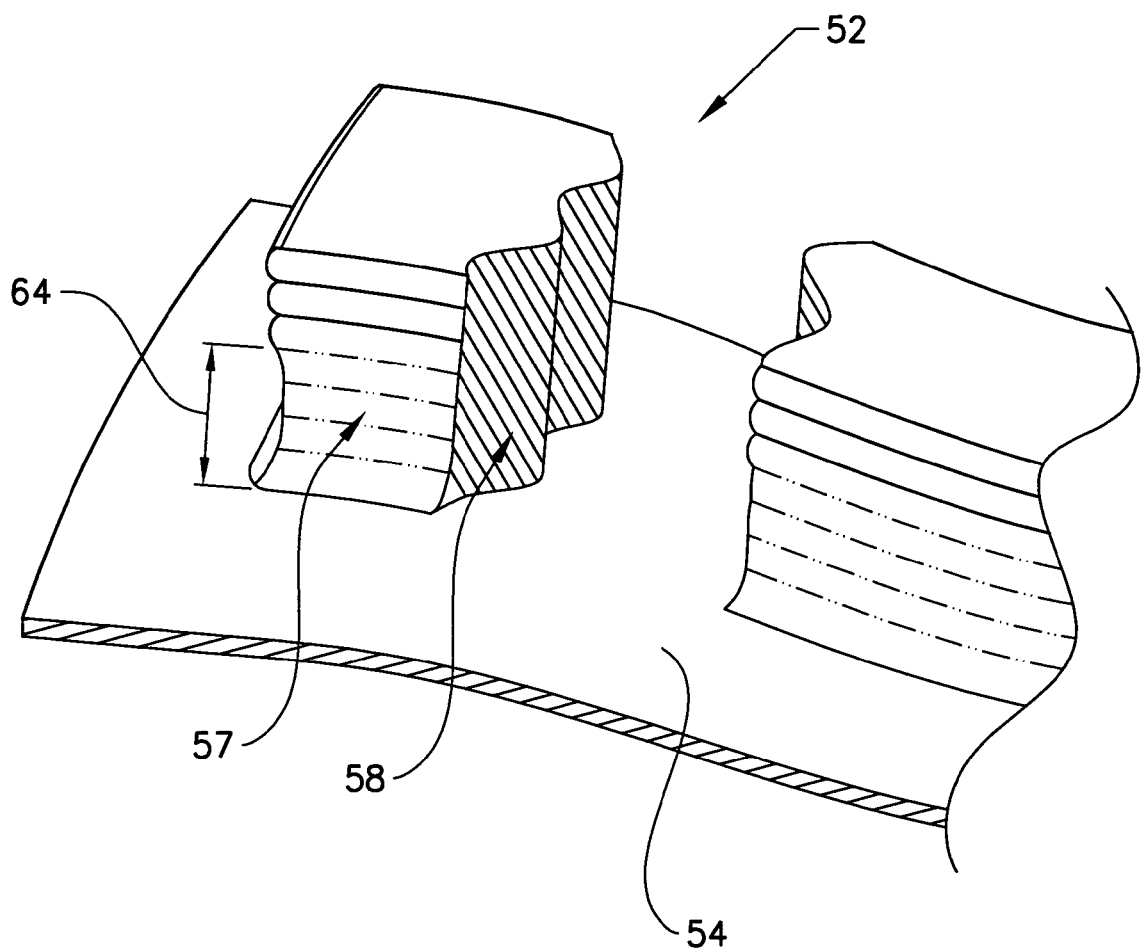
FIG. 5 illustrates a component in FIG. 4 in a perspective view after a step of re-melting has been performed.

FIG. 5 shows the component shown in FIG. 4, after the method step of re-melting of a lower rim 64. The lower rim extends to include a plurality of layers. In the example shown in FIG. 5, the lower rim 64 includes the 4 bottom layers 56a-56d deposited in a sequential manner when forming the component, starting with the layer 56a uniting the component 52 with the substrate 54. As may be seen the layers which were discerned by fine lines 60a-60d are less distinct after the re-melting, since the re-melting of the lower rim reshapes the lower rim such that the individual layers become less distinctive. The surface roughness of the lower rim is therefore reduced. The outer rims 62a-62e of each layer in the lower rim will change their curvature such that the surface of the outer rim is smoother. If sufficient heat is provided, the lower rim will change its appearance from being constituted by a set of outer rims each having a convex curvature, where each outer rim is separated by the fine line 60a-60d forming an indentation in the surface of the lower rim 64 to a lower rim having a concave smooth surface which may properly function as a fillet radius. The indentations present before re-melting may result in formation of cracks due to stress concentration. By re-melting of the lower rim the surface becomes smoother and stress concentration is reduced. It is particularly advantageous if the lower rim after the re-melting assumes a concave curvature. In FIG. 5, the lower rim has assumed a concave curvature. The concave curvature allows for a relative large curvature radius at the transition between the substrate 54 forming the engine structure and the deposited component. Since stress concentration occurs at the transition between the engine structure and the component, the formation of a concave smooth surface at this area substantially reduces the risk for fatigue failure.

Figure 6:
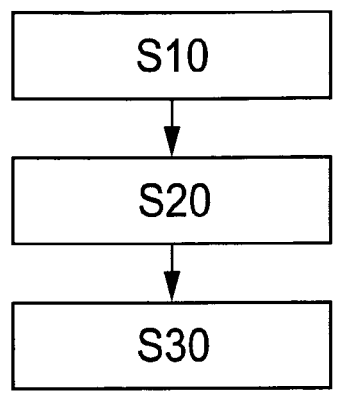
FIG. 6 shows a flow chart of a method according to the invention.

In FIG. 6 a block scheme of a method according to the invention is shown. In a first method step S10 an engine component is manufactured by forming a component on a substrate by deposition of molten metal in subsequent layers to form said component into a desired shape. The shape of the component may be stored as a CAD file which controls the movement of a deposition ejection nozzle. Molten metal is ejected from the nozzle and deposited on an intended location by controlled movement of the nozzle or the substrate on which the molten metal in injected. The component is built up by sequent deposition of a plurality of layers until the body of the component is formed. The body will have an outer surface delimited by the outer rims of the sequentially deposited layers. In a preferred embodiment the component is deposited on an engine structure by performing the deposition of molten metal in subsequent layers to form said component into a desired shape using said engine structure as a substrate. The component may however in a subsequent process step S30 be attached to an engine structure after the component has been fabricated into its final shape. In the event the component is attached to an engine structure or after the component has been formed on an engine structure, the outer surface of said component will include a lower rim at which a transition between said component and said engine structure is located. This part will, include a set of outer rims each having a convex curvature. In a second method step S20 at least part of said outer surface is re-melted. The re-melting is performed in order to reshape the at least part of the outer surface which is heat treated in order to create a smooth surface and in order to reduce a surface roughness of said at least part of said outer surface. Particularly, in the event the component is attached to an engine structure or fabricated on an engine structure, the lower rim at which a transition between the component and the structure is located will be subject to re-melting in order to reduce the surface roughness of the lower rim. The re-melting will preferably be local such that merely the lower rim is subject to the re-melting. The re-melting is preferably performed with the same heat source as is used to melt the metal in the metal deposition process. The heat source is preferably a laser. The lower rim or the at least part of the outer surface preferably comprises a number of layers, preferably between 3-20 layers, more preferably between 5 and 10 layers. After the re-melting a concave curvature is preferably assumed. With a concave curvature is intended that a cross section through the lower rim will have an outer surface which smoothly diverges toward the connection between the component and the engine structure. An inclination of an upper surface to a plane of the engine structure at a location where the component is located, will gradually change in a direction toward the engine structure such that the inclination will become more coplanar with the upper surface of the engine structure to which upper surface the component is attached when approaching the engine structure.

Preferably the re-melting comprises heating the lower rim to a temperature corresponding to or above the melting temperature of the deposited metal. The re-melting may preferably comprise re-melting said rim. The component may suitable be fabricated of typical aerospace alloys such as titanium alloys: Ti6AI4V Ti6-2Sn-4Zr-2Mo; nickel alloys IN718, IN718+, waspalloy and steel alloys: Greek Asoloy, 17-4 PH.

In preferred embodiments a radius of said concave surface is in the range of from 1 mm to 10 mm, with standard tolerances for aerospace parts. The surface roughness of said rim after said re-melting should fulfill standard tolerances for aerospace parts, a suitable surface roughness is around Ra 3.2. The rim after said re-melting may be essentially free from nodules formed by from excess material during metal deposition. The rim after said re-melting should preferably be essentially free from cracks. The rim after said re-melting may be essentially free from pores.

Figure 7:
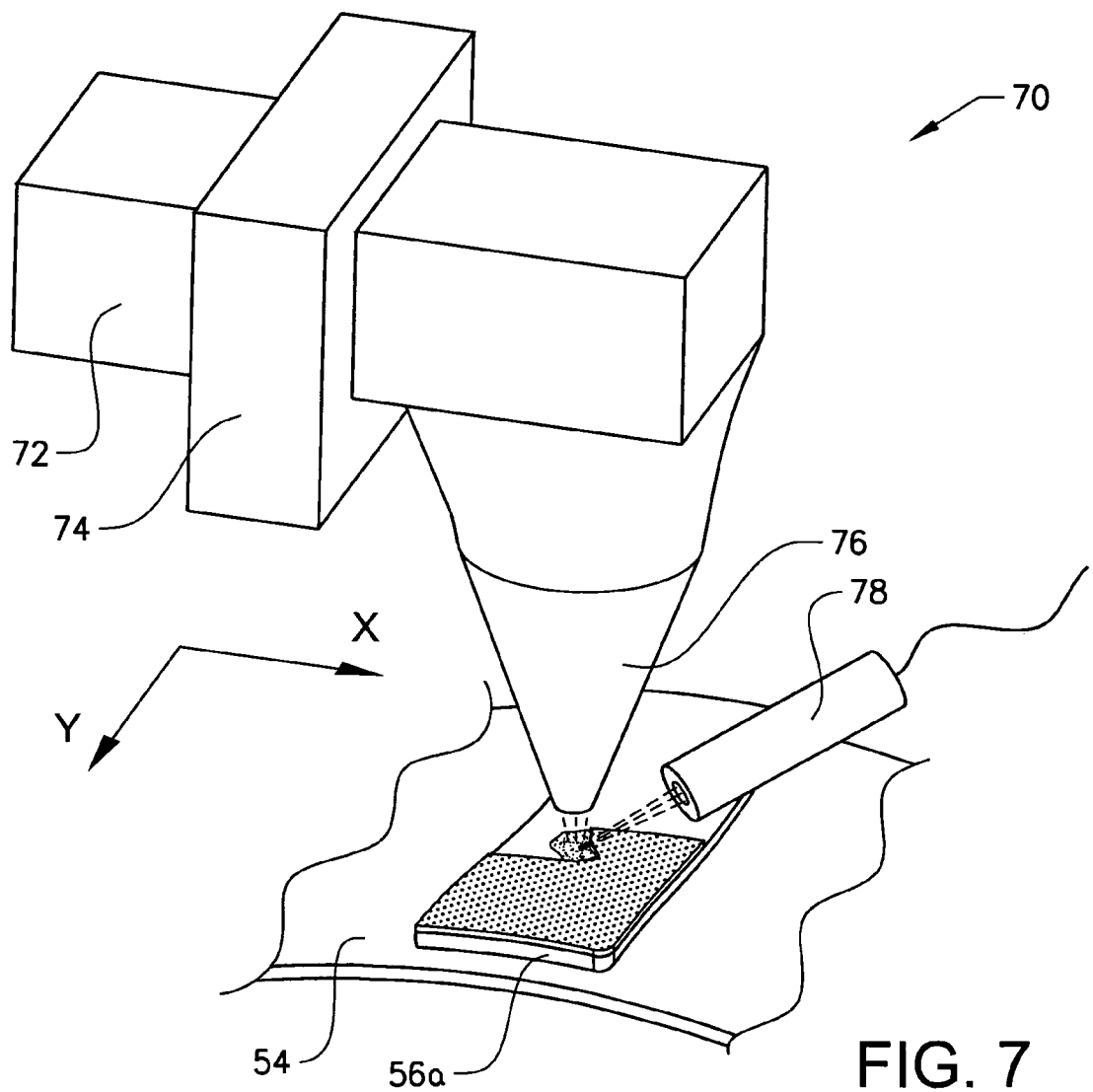
FIG. 7 shows a schematic drawing of a metal deposition apparatus for performing the method.

In FIG. 7 a schematic drawing of a metal deposition apparatus 70 for performing the method is shown. The metal deposition apparatus is of a standard type which therefore needs not to be described in detail. The metal deposition apparatus 70 includes a powder storage 72, a powder feeder 74 which transports the powder from the storage 72 to a depositing nozzle 76 and an energy source 78 which is used to melt the powder to provide molten metal. The deposition nozzle 76 may be controllably movable relatively to the substrate. Instead of a powder application technique a wire and a wire feeder may be used. This may be performed by moving the nozzle or by moving the substrate. According to the invention the same source is preferable used for melting the metal and for re-melting of the at least part of the outer surface of the component. The source is preferable a laser.

The invention is not delimited to the embodiments described above but may be freely varied within the scope of the claims. In particular the component may be any component that may suitable be fabricated by a metal deposition technology and which is attached or formed on an engine component. Examples of such components are stubs bosses and other protrusions from engine structures. The component may be fabricated on a static or a rotatable engine structure. The engine component may not necessarily be a ring shaped component but mat be any engine structure. Even though it is disclosed in the examples that the component is fabricated on a ring shaped element comprising a sheet metal structure, the component may also be attached to or fabricated on a cast part.

The invention claimed is:

1. A method for manufacturing an engine component comprising the steps of:
   forming the component on a substrate by adding molten metal in a layer by layer fashion to form the component into a desired shape, the component having an outer surface; and
   re-melting at least part of the outer surface such that material is relocated from one location to another desired location
   wherein the component formed on the substrate by adding molten metal in the layer by layer fashion comprises a plurality of layers, each of the plurality of layers having an edge surface including at least a portion having a convex shape, and wherein the re-melting is achieved through controlling a degree of re-melting by a heat source, thereby transforming the convex shape of the portion on a plurality of the plurality of layers into the desired shape having a single common at least partially concave curvature.

2. A method according to claim 1, comprising reshaping the at least part of the outer surface after it is re-melted.

3. A method according to claim 1, wherein the at least part of the outer surface is re-melted so that a surface roughness thereof is reduced.

4. A method according to claim 1, wherein the same heat source is used in the re-melting step as the heat source used to melt the metal when adding molten metal in a layer by layer fashion to form the component.

5. A method according to claim 1, the step of attaching the formed component to an engine structure.

6. A method according to claim 1, wherein the component is formed directly on an engine structure by performing the addition of molten metal in a layer by layer fashion to form the component into a desired shape using the engine structure as a substrate.

7. A method according to claim 1, wherein the outer surface of the component includes a lower rim at which a transition between the component and the engine structure is located and that the at least part of the outer surface which is re-melted is constituted by the lower rim.

8. A method according to claim 1, wherein the re-melting is local whereby the component includes a portion which is not re-melted and a portion which is re-melted.

9. A method according to claim 1, wherein re-melting is performed by a laser.

10. A method according to claim 1, wherein the at least part of the outer surface comprises a plurality of metal deposited layers.

11. A method according to claim 1, forming the component on the substrate by adding molten metal in a layer by layer fashion on top of each other, wherein the at least part of the outer surface is defined by the ends of the layers in a layer extension direction.

12. A method according to claims 11, comprising depositing a plurality of the layers with different lengths in the layer extension direction so that the outer surface assumes a curvature.

13. A method for according claim 1, wherein the at least part of the outer surface which is subject to re-melting assumes a concave curvature.

14. A method according to claim 1, wherein the re-melting comprises heating the at least part of the outer surface to a temperature corresponding to or above the melting temperature of the deposited metal.

15. A method according to claim 1, wherein the method step of re-melting at least part of the outer surface is performed without depositing any material.

16. A method according to claim 1, wherein the substrate is formed by a ring element for an engine structure and that the component forms part of a radial element extending from the ring element for guiding a gas flow through an engine in operation.

17. A method according to claim 1, wherein the engine component is adapted for an aircraft or space engine structure.

18. A method according to claim 1, wherein re-melting of the at least part of the outer surface makes the edge surface of the at least one layer concave.

* * * * *